United States Patent
Hyun et al.

(10) Patent No.: US 10,511,995 B2
(45) Date of Patent: Dec. 17, 2019

(54) APPARATUS AND METHOD FOR CONTROLLING TRAFFIC IN WIRELESS COMMUNICATION SYSTEM

(71) Applicant: Samsung Electronics Co., Ltd., Suwon-si, Gyeonggi-do (KR)

(72) Inventors: Dowon Hyun, Seoul (KR); Seungyoup Han, Suwon-si (KR); Hanseok Kim, Seoul (KR); Jeewoong Kang, Seoul (KR); Myungkwang Byun, Suwon-si (KR); Jai-Jin Lim, Seoul (KR); Jaeho Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/868,494

(22) Filed: Jan. 11, 2018

(65) Prior Publication Data

US 2018/0199231 A1     Jul. 12, 2018

(30) Foreign Application Priority Data

Jan. 11, 2017   (KR) .................. 10-2017-0004398

(51) Int. Cl.
  *H04W 28/02*    (2009.01)
  *H04W 28/22*    (2009.01)
  (Continued)

(52) U.S. Cl.
  CPC ... *H04W 28/0289* (2013.01); *H04W 28/0268* (2013.01); *H04W 28/0284* (2013.01); *H04W 28/22* (2013.01); *H04W 72/1226* (2013.01); *H04W 72/1242* (2013.01); *H04W 72/1247* (2013.01); *H04W 72/1252* (2013.01); *H04W 88/02* (2013.01); *H04W 88/08* (2013.01); *H04W 88/16* (2013.01)

(58) Field of Classification Search
  CPC ......... H04W 28/0289; H04W 28/0268; H04W 28/0284; H04W 28/22; H04W 72/1226; H04W 72/1242; H04W 72/1247
  See application file for complete search history.

(56) References Cited

U.S. PATENT DOCUMENTS 6,445,679 B1 * 9/2002 Taniguchi ............... H04L 12/26
2010/0067400 A1   3/2010 Dolganow et al.
(Continued)

FOREIGN PATENT DOCUMENTS

| EP | 2 385 721 A1 | 11/2011 |
| EP | 2 933 951 A1 | 10/2015 |
| KR | 10-2015-0021847 A | 3/2015 |

OTHER PUBLICATIONS

Nokia Networks; Solutions: NetAct; https://networks.nokia.com/solutions/netact; Jan. 4, 2018.
(Continued)

*Primary Examiner* — Ronald B Abelson
(74) *Attorney, Agent, or Firm* — Jefferson IP Law, LLP

(57) ABSTRACT

A method for operating an apparatus that performs traffic control traffic in a wireless communication system is provided. The method includes receiving information about a terminal to be controlled, detecting a congestion situation in a cell, and changing a parameter relating to scheduling of the terminal to be controlled, according to the detection of the congestion situation.

12 Claims, 12 Drawing Sheets

(51) Int. Cl.
*H04W 72/12* (2009.01)
*H04W 88/02* (2009.01)
*H04W 88/16* (2009.01)
*H04W 88/08* (2009.01)

(56) References Cited

U.S. PATENT DOCUMENTS

| | | | |
|---|---|---|---|
| 2011/0261695 A1* | 10/2011 | Zhao | H04L 12/56 |
| 2012/0250509 A1* | 10/2012 | Leung | H04W 24/04 |
| 2014/0198637 A1 | 7/2014 | Shan et al. | |
| 2014/0355428 A1 | 12/2014 | Smith et al. | |
| 2015/0023168 A1 | 1/2015 | Kotecha et al. | |
| 2015/0138970 A1 | 5/2015 | Tabatabaee et al. | |
| 2015/0141030 A1 | 5/2015 | Basu-Mallick et al. | |
| 2016/0227434 A1* | 8/2016 | Grinshpun | H04W 28/0289 |

OTHER PUBLICATIONS

Extended European Search Report dated Jul. 26, 2019, issued in European Application No. 18738436.7.

* cited by examiner

APPARATUS AND METHOD FOR CONTROLLING TRAFFIC IN WIRELESS COMMUNICATION SYSTEM

CROSS-REFERENCE TO RELATED APPLICATION(S)

This application claims the benefit under 35 U.S.C. § 119(a) of a Korean patent application filed on Jan. 11, 2017 in the Korean Intellectual Property Office and assigned Serial number 10-2017-0004398, the entire disclosure of which is hereby incorporated by reference.

TECHNICAL FIELD

The present disclosure relates to a wireless communication system. More particularly, the present disclosure relates to an apparatus and method for controlling traffic in a wireless communication system.

BACKGROUND

The development of wireless communication technology has enabled high speed and large volume data services in a mobile communication environment. However, a data service is provided by using limited times, a limited frequency, and limited hardware resources and thus may have a capacity limitation. Therefore, if the volume of traffic for a data service exceeds a range of a traffic volume acceptable in a system, problems including disconnection of the service may occur. In addition, if a user causes a relatively large volume of traffic, another user may feel deterioration in quality. Therefore, in order to maintain a stable and smooth state of a service, traffic control is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for further efficiently controlling traffic in a wireless communication system.

In addition, the present disclosure provides an apparatus and method for controlling traffic on the basis of a user quality of experience (QoE) in a wireless communication system.

In addition, the present disclosure provides an apparatus and method for controlling traffic through control of a parameter relating to scheduling in a wireless communication system.

In addition, the present disclosure provides an apparatus and method for identifying a heavy user in a wireless communication system.

In addition, the present disclosure provides an apparatus and method for performing traffic control for each user in a wireless communication system.

In addition, the present disclosure provides an apparatus and method for marking a packet relating to an application subjected to traffic control, in a wireless communication system.

In addition, the present disclosure provides an apparatus and method for performing traffic control for each application in a wireless communication system.

In accordance with an aspect of the present disclosure, an operation method of an apparatus that performs traffic control in a wireless communication system is provided. The method includes receiving information about a terminal to be controlled, detecting a congestion situation in a cell, and changing a parameter relating to scheduling of the terminal to be controlled, according to the detection of the congestion situation.

In accordance with another aspect of the present disclosure, an operation method of a management server in a wireless communication system is provided. The method includes receiving information on traffic usage of terminals from a gateway, and when a terminal to be controlled, having a traffic usage exceeding a threshold value is identified, transmitting information about the terminal to be controlled.

In accordance with another aspect of the present disclosure, an operation method of a gateway in a wireless communication system is provided. The method includes receiving a downlink packet, when a source address of the downlink packet corresponds to an address of a server providing an application subjected to traffic control, inserting an indicator into the packet, and transmitting the packet including the indicator to a base station.

In accordance with another aspect of the present disclosure, an apparatus that performs traffic control in a wireless communication system is provided. The apparatus includes a reception unit that receives information about a terminal to be controlled, and a controller that detects a congestion situation in a cell, and when a congestion situation occurs in a cell, changes a parameter relating to scheduling of the terminal to be controlled, according to the detection of the congestion situation.

In accordance with another aspect of the present disclosure, a management server apparatus in a wireless communication system the apparatus includes a reception unit that receives information on traffic usage of terminals from a gateway, and a transmission unit that, when a terminal to be controlled, having a traffic usage exceeding a threshold value is identified, transmits information about the terminal to be controlled.

In accordance with another aspect of the present disclosure, a gateway apparatus in a wireless communication system includes a reception unit that receives a downlink packet, a controller that, when a source address of the downlink packet corresponds to an address of a server providing an application subjected to traffic control, inserts an indicator into the packet, and a transmission unit that transmits the packet including the indicator to a base station.

An apparatus and a method according to various embodiments of the present disclosure control traffic through control of a scheduling parameter, and thus can improve a user quality of experience (QoE).

Other aspects, advantages, and salient features of the present disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure described below, a hardware access method is explained as an example. However, the various embodiments of the present disclosure include a technology using all hardware and software and therefore, it is not that the various embodiments of the present disclosure exclude a software based access method.

Hereinafter, the present disclosure relates to an apparatus and method for controlling traffic in a wireless communication system. Particularly, the present disclosure includes a description on a technology for controlling traffic on the basis of a user quality of experience (QoE) in a wireless communication system.

The term indicating the state of a terminal, the term indicating parameters relating to a bearer or scheduling, the term indicating network entities, and the term indicating a component of an apparatus, which are used in the following description, are exemplified for convenience of the description. Accordingly, the present disclosure is not limited to the following terms and other terms having the same technical meaning may be used.

In addition, the present disclosure describes various examples using a long-term evolution (LTE) system and a LTE-advanced (LTE-A) system. However, the systems merely correspond to an example for the description. Various embodiments in the present disclosure can be easily modified and then applied to another communication system.

Figure 1:
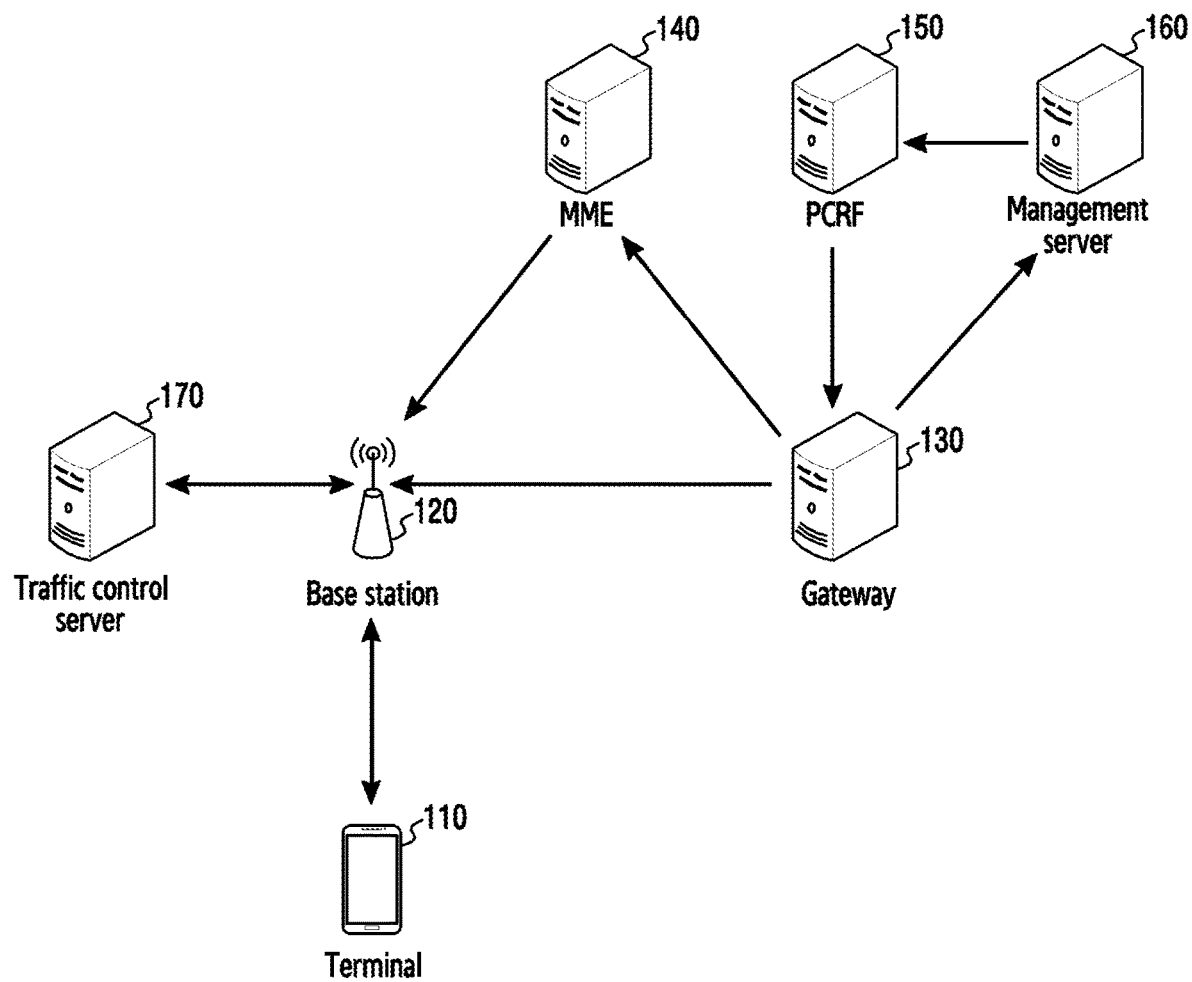
FIG. 1 illustrates a wireless communication system according to various embodiments of the present disclosure.

FIG. 1 illustrates a wireless communication system according to various embodiments of the present disclosure.

Referring to FIG. 1, a wireless communication system includes a terminal 110, a base station 120, a gateway 130, a mobility management entity (MME) 140, a policy and charging rule function (PCRF) 150, a management server 160, and a traffic control server 170.

The terminal 110 is an apparatus used by a user and communicates with the base station 120 through a wireless channel. According to circumstances, the terminal 110 may be operated without involvement of a user. That is, at least one of terminals 110 is an apparatus that performs machine type communication (MTC), and may not be carried by a user. Each terminal 110 may be referred to as "a user equipment (UE)", "a mobile station", "a subscriber station", "a remote terminal", "a wireless terminal", or "a user device", beside a terminal, or another term having the same technical meaning.

The base station 120 corresponds to a network infrastructure that provides wireless connection to the terminal 110. The base station 120 has a coverage defined by a particular geographical region on the basis of a distance by which a base station 120 can transmit a signal. The base station 120 may be referred to as "an access point (AP)", "an evolved Node B (eNB)", "a 5th Generation (5G) node", "a wireless point", or "a transmission/reception point (TRP)", besides a base station, or another term having the same technical meaning.

The gateway 130 may function as a connection point with an external network (for example, internet network). In addition, the gateway 130 may assign an internet protocol (IP) address to the terminal 110 and may serve as an anchor. The MME 140 manages the mobility of the terminal 110. In addition, the MME 140 may further perform authentication of the terminal 110 and bearer management. The PCRF 150 may apply a quality of service (QoS) policy of the terminal 110 and may manage charging data.

The management server 160 processes charging on the basis of service usage. The management server 160 may be operated by a network provider. The management server 160 may be referred to as "an element management system (EMS)", "a network management system (NMS)", "an online charging system (OCS)", or another term having the same technical meaning.

The traffic control server 170 performs functions for controlling traffic. Particularly, the traffic control server 170 may receive information required for traffic control from the base station 120 and may perform traffic control on the basis of the received information. For example, the traffic control server 170 may control a parameter relating to scheduling of a terminal to be controlled.

Each of the base station 120, the gateway 130, the MME 140, the PCRF 150, the management server 160, and the traffic control server 170, which are illustrated in FIG. 1, is described as a separate entity. However, at least two entities of the base station 120, the gateway 130, the MME 140, the PCRF 150, the management server 160, and the traffic control server 170 may be implemented in one apparatus. For example, at least two entities may be implemented as software in a general-purpose server. Specifically, according to various embodiments, the traffic control server 170 and the base station 120 may be implemented in one apparatus. In this case, information exchange between the traffic control server 170 and the base station 120 may be understood as an internal operation of the base station 120. Therefore, for convenience of the description, the traffic control server 170 and the base station 120 are described as separate entities in the following description, but the present disclosure is not limited thereto.

Figure 2:
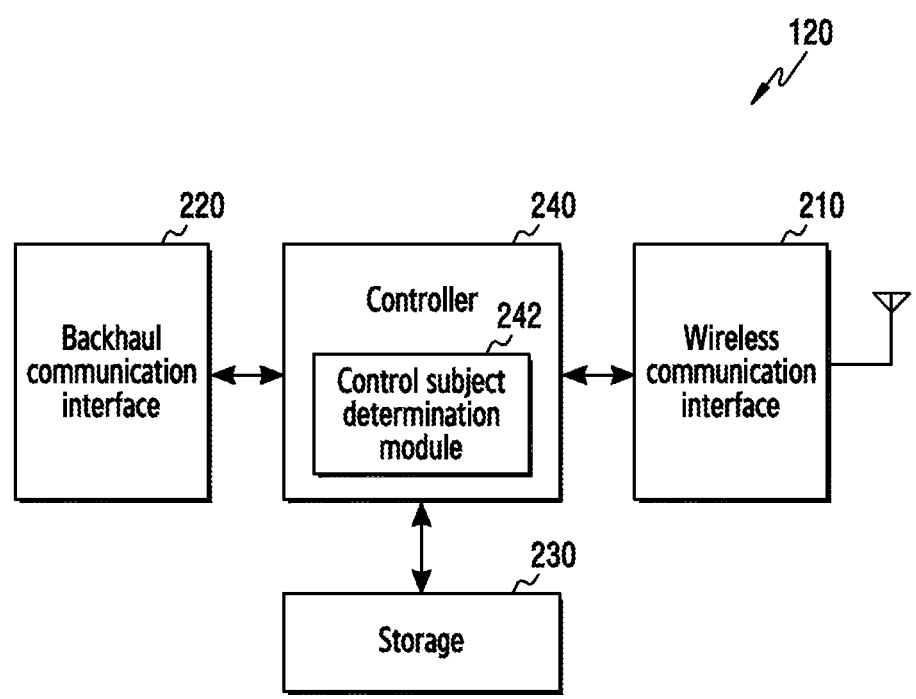
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration exemplified in FIG. 2 may be understood as a configuration of the base station 120. The term "~unit" or "~er" used hereinafter may refer to the unit for processing at least one function or operation and may be implemented in hardware, software, or a combination of hardware and software.

Referring to FIG. 2, the base station 120 includes a wireless communication interface 210 (e.g., a transceiver), a backhaul communication interface 220, a storage 230 (e.g., a memory), and a controller 240 (e.g., at least one processor).

The wireless communication interface 210 performs functions for transmitting and receiving a signal through a wireless channel. For example, the wireless communication interface 210 performs a function of conversion between a baseband signal and a bitstream according to a physical layer standard of a system. For example, when data is transmitted, the wireless communication interface 210 generates complex symbols by encoding and modulating a transmission bitstream. In addition, when data is received, the wireless communication interface 210 restores a reception bitstream through demodulating and decoding of a baseband signal. In addition, the wireless communication interface 210 up-converts a baseband signal to a radio frequency (RF) band signal, then transmits the RF band signal through an antenna, and down-converts a RF band signal received through the antenna to a baseband signal. To this end, the wireless communication interface 210 may include a transmission filter, a reception filter, an amplifier, a mixer, an oscillator, a digital to analog Converter (DAC), an analog to digital Convertor (ADC), etc. In addition, the wireless communication interface 210 may include a plurality of transmission or reception paths. Further, the wireless communication interface 210 may include at least one antenna array having a plurality of antenna elements. In view of hardware, the wireless communication interface 210 may include a digital unit and an analog unit. The analog unit may include a plurality of sub-units according to operating power and operating frequency.

The wireless communication interface 210 transmits and receives a signal, as described above. Accordingly, the wireless communication interface 210 may be referred to as "a transmission unit", "a reception unit", or "a transmission and reception unit". In addition, in the following description, the meaning of transmission and reception which are performed through a wireless channel includes performing the processes described above by the wireless communication interface 210.

The backhaul communication interface 220 provides an interface for performing communication with other nodes within a network. That is, the backhaul communication interface 220 converts a bitstream to be transmitted from the base station 120 to another node, for example, another connection node, another base station, an upper node, a core network, into a physical signal, and converts a physical signal received from another node into a bitstream.

The storage 230 stores data, such as a basic program, an application program, and setup information, for operating the base station 120. The storage 230 may include a volatile memory, a nonvolatile memory, or a combination thereof. The storage 230 provides stored data in response to a request of the controller 240.

The controller 240 controls overall operations of the base station 120. For example, the controller 240 transmits and receives a signal through the wireless communication interface 210 or the backhaul communication interface 220. Further, the controller 240 records data in the storage 230 and reads the recorded data. To this end, the controller 240 may include at least one processor. According to various embodiments, the controller 240 may include a control subject determination module 242. The control subject determination module 242 may identify at least one terminal to which traffic control is applied in a congestion situation. The control subject determination module 242 may correspond to a command set or a code, stored in the storage 230, and may correspond to a command/code at least temporarily resided in the controller 240, a storage space in which a command/code is stored, or a part of circuitry included in the controller 240. For example, the controller 240 may control the base station 120 such that the base station 120 performs operations according to various embodiments in the following description.

Figure 3:
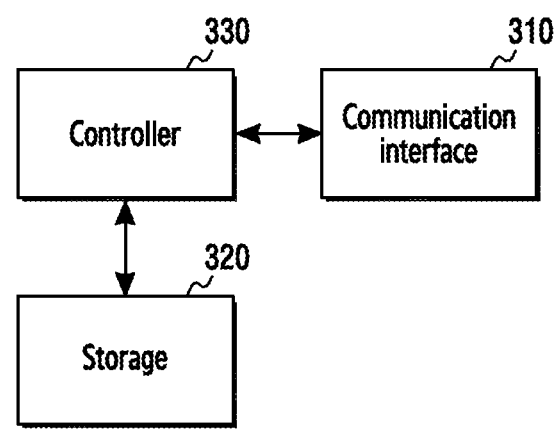
FIG. 3 illustrates a configuration of a network entity in a wireless communication system according to various embodiments of the present disclosure.

FIG. 3 illustrates a configuration of a network entity in a wireless communication system according to various embodiments of the present disclosure. The configuration exemplified in FIG. 3 may be understood as a configuration of one of the gateway 130, the MME 140, the PCRF 150, the management server 160, and the traffic control server 170. The term "~unit" or "~er" used hereinafter may refer to the unit for processing at least one function or operation and may be implemented in hardware, software, or a combination of hardware and software.

Referring FIG. 3, the network entity includes a communication interface 310 (e.g., a transceiver), a storage 320 (e.g., a memory), and a controller 330 (e.g., at least one processor). The network entity may include at least one of the gateway 130, the MME 140, the PCRF 150, the management server 160, and the traffic control server 170.

The communication interface 310 provides an interface in order to communicate with other nodes in a network. That is, the communication interface 310 converts a bitstream to be transmitted from the gateway to another entity into a physical signal, and converts a physical signal received from another entity into a bitstream. That is, the communication interface 310 may transmit and receive a signal. Accordingly, the communication interface 310 may be referred to as "a transmission unit", "a reception unit", or "a transmission and reception unit".

The storage 320 stores data, such as a basic program, an application program, and setup information, for operating a network entity. The storage 320 may include a volatile memory, a nonvolatile memory, or a combination thereof. The storage 320 provides stored data in response to a request of the controller 330.

The controller 330 controls overall operations of a network entity. For example, the controller 330 transmits and receives a signal through the communication interface 310. Further, the controller 330 records data in the storage 320 and reads the recorded data. According to various embodiments, the controller 330 may control a network entity such that the network entity performs operations of one of the gateway 130, the MME 140, the PCRF 150, the management server 160, and the traffic control server 170 in the following description.

Figure 4:
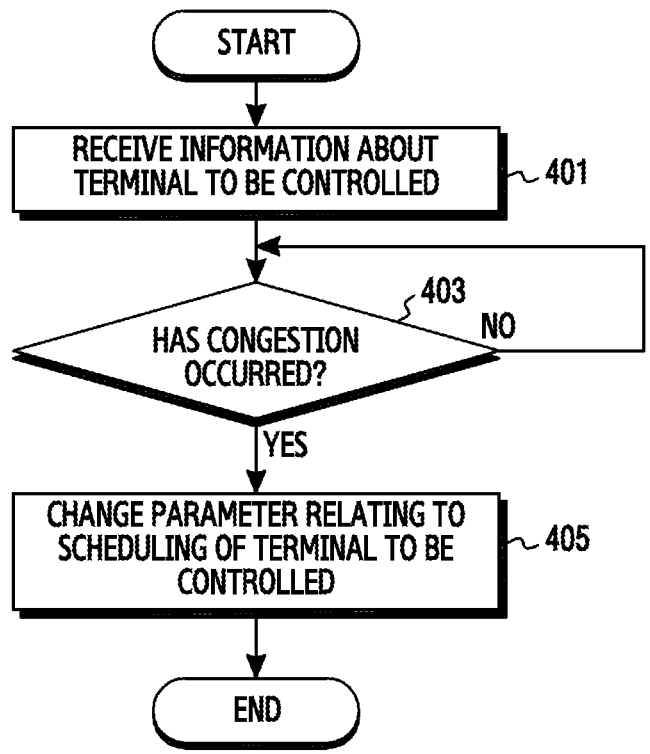
FIG. 4 illustrates an operation method for traffic control in a wireless communication system according to various embodiments of the present disclosure.

FIG. 4 illustrates an operation method for traffic control in a wireless communication system according to various embodiments of the present disclosure. The operations exemplified in FIG. 4 may be performed by the base station 120 or the traffic control server 170. Hereinafter, the subject of the operations illustrated in FIG. 4 is referred to as "a controlling device" for convenience of the description.

Referring to FIG. 4, in operation 401, the controlling device receives information about a terminal to be controlled. In other words, the controlling device receives information about a heavy user. According to an embodiment, when the controlling device is the traffic control server 170, the controlling device may receive identification information about a heavy user from the base station 120. According to another embodiment, the controlling device is the base station 120, the controlling device may receive identification information about a heavy user from an upper node (for example, MME). Accordingly, the controlling device may identify a heavy user among terminals connected to the base station 120.

Then, in operation 403, the controlling device determines whether congestion occurs. In other words, the controlling device determines whether congestion occurs in a cell of the base station 120 that is, whether a load level exceeds a threshold level. A standard for determining congestion may be variously defined. For example, congestion may be determined on the basis of at least one of resource usage (for example, usage of a physical resource block (PRB)), the number of connected terminals, the number of terminals in a radio resource control (RRC) connection state, the number of active terminals, and data throughput.

In operation 405, the controlling device changes a parameter relating to scheduling of the terminal to be controlled. In other words, the controlling device changes a parameter relating to scheduling on at least one heavy user in a cell in which congestion occurs. A parameter relating to scheduling may be a parameter relating to determination of scheduling priority, a parameter relating to a maximum transmission rate, or another parameter affecting data throughput. Accordingly, although not illustrated in FIG. 4, the base station may transmit downlink data to the terminal to be controlled, through resources assigned depending on a changed parameter relating to scheduling.

As described with reference to FIG. 4, the controlling device (for example, the base station 120 or the traffic control server 170) performs traffic control by changing a parameter relating to scheduling of heavy users when congestion occurs in a cell. As described above, the controlling device according to various embodiments performs traffic control for a heavy user in a radio access network (RAN) instead of a core network. Further, a degree of a load in an individual base station, a user quality of experience, a wireless environment, etc. are taken into consideration in order to determine whether traffic control is performed, so that adaptive traffic control may be performed according to a RAN environment.

As described above, the controlling device may determine the need for traffic control according to whether there is congestion and may perform traffic control. A congestion situation may be variously determined. In order to control traffic on the basis of a quality of experience (QoE), the controlling device may define a standard showing qualities of experience for users, and when wireless network users are not satisfied with a designated index of quality of experience, may determine that a congestion situation occurs. For example, whether there is congestion may be determined on the basis of at least one of resource usage, the number of connected terminals, the number of terminals in a RRC connection state, the number of active terminals, and data throughput. According to an embodiment, whether there is congestion may be determined on the basis of the throughput of an internet protocol (IP) packet, that is, IP throughput. That is, whether there is congestion may be determined according to a ratio of a terminal having an IP throughput equal to or less than a predetermined threshold value. Specifically, a standard for determining whether there is congestion may be defined as one among conditions shown in table 1 below, or a combination (for example, a combination of an "and" condition, and a combination of an "or" condition) of at least two conditions among the conditions.

TABLE 1

| | The contents of conditions |
|---|---|
| 1 | A ratio of a terminal having a throughput of 520 Kbps or less in distribution of IP throughput of terminals is $P_1$% |
| 2 | A ratio of a terminal having a throughput of 1 Mbps or less in distribution of IP throughput of terminals is $P_2$% |
| 3 | A ratio of a terminal having a throughput of 3 Mbps or less in distribution of IP throughput of terminals is $P_3$% |
| 4 | A ratio of a terminal having a throughput of 5 Mbps or less in distribution of IP throughput of terminals is $P_4$% |

Figure 5:
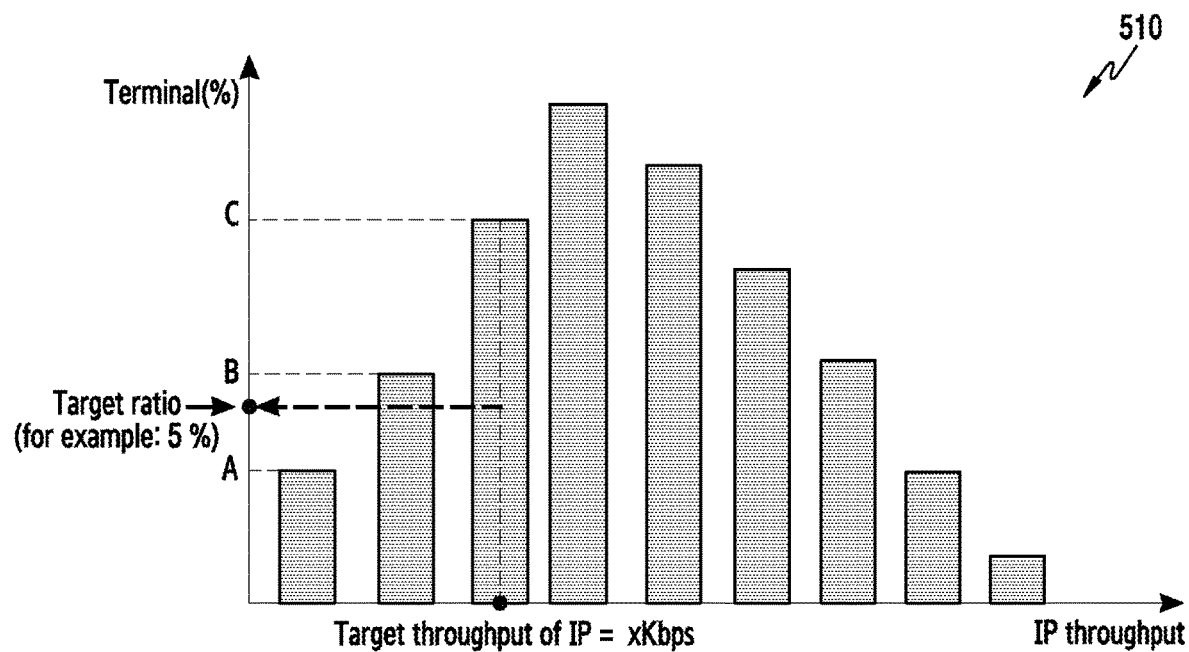
FIG. 5 illustrates an example of change in distribution of throughput depending on traffic control in a wireless communication system according to various embodiments of the present disclosure.
Figure 5:
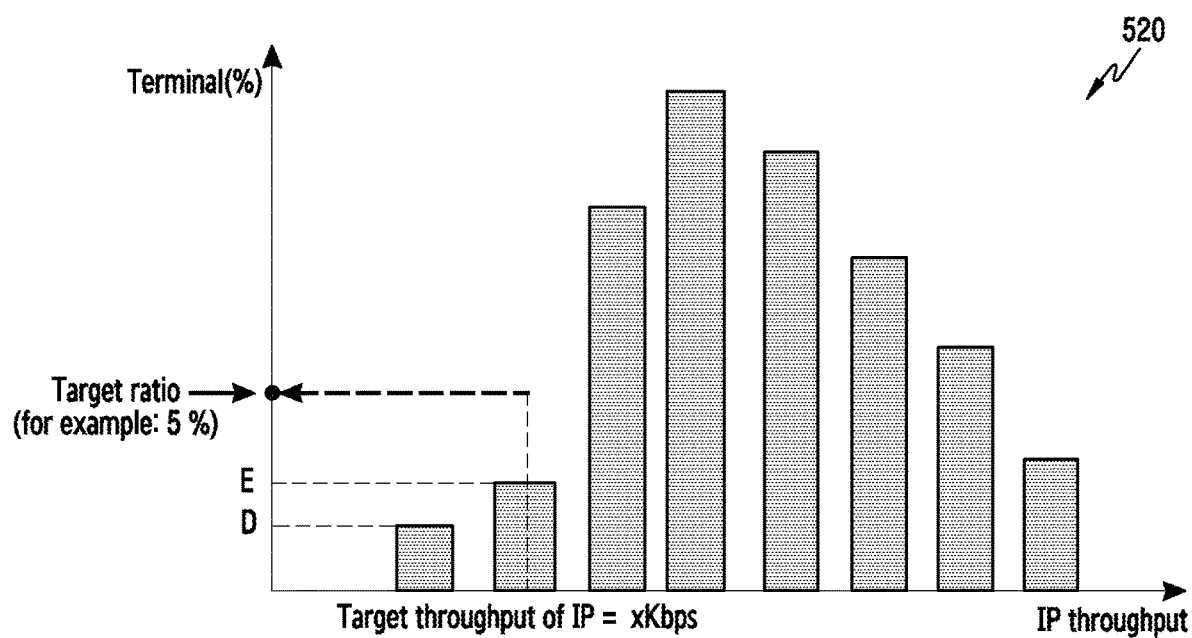

More particularly, as described in FIG. 5, a target throughput of IP may be configured as x Kbps.

FIG. 5 illustrates an example of change in distribution of throughput depending on traffic control in a wireless communication system according to various embodiments of the present disclosure. The case of FIG. 5 corresponds to an example in which one condition is used, and when a ratio of terminals having a throughput of 520 Kbps or less is 5% or more in the distribution of IP throughput of terminals, a congestion state may be determined.

Referring to FIG. 5, in situation 510, a ratio of terminals having a target throughput of IP or less is A+B+C %, and the terminals exist at a target ratio of 5% or more. Therefore, situation 510 may be determined as a congestion situation. In this case, according to a procedure described with reference to FIG. 4, traffic control, that is, changing of a parameter relating to scheduling on a heavy user may be performed. Accordingly, as in situation 520, a ratio of terminals having a target throughput of IP or less is D+E %, and the ratio may become smaller than a target ratio of 5%. In other words, a congestion situation may be relieved.

As described above, a congestion situation may be determined according to various standards. Specifically, whether there is congestion is determined on the basis of an index, such as IP throughput for each user, which is closely related to a user quality of experience. Therefore, a user quality of experience can be improved. Not only the determination on whether to perform traffic control, but also traffic control may be performed on the basis of a quality of experience.

For example, the controlling device adjusts a priority of resource scheduling on a terminal to be controlled, in service, thereby adjusting an allocated ranking in comparison with a normal user. In addition, the controlling device may control to allocate wireless resource allowed to be allocated for a terminal to be controlled, to another terminal by adjusting QoS according to a charging policy. Therefore, the base station 120 can perform an efficient resource distribution for improving a quality of experience of normal subscribers, in consideration of both a wireless environment and a policy on an individual subscriber.

According to an embodiment, the controlling device can perform normal scheduling on all terminals in a normal situation, that is, when there is no congestion situation. When the base station 120 enters a congestion situation, the controlling device performs low priority scheduling on a heavy user. When a quality of experience of terminals is not improved in spite of lowering scheduling priority, the controlling device controls a maximum transmission rate as well as a low priority scheduling on a heavy user, thereby performing more powerful control on the heavy user. This procedure will be described with reference to FIG. 6.

Figure 6:
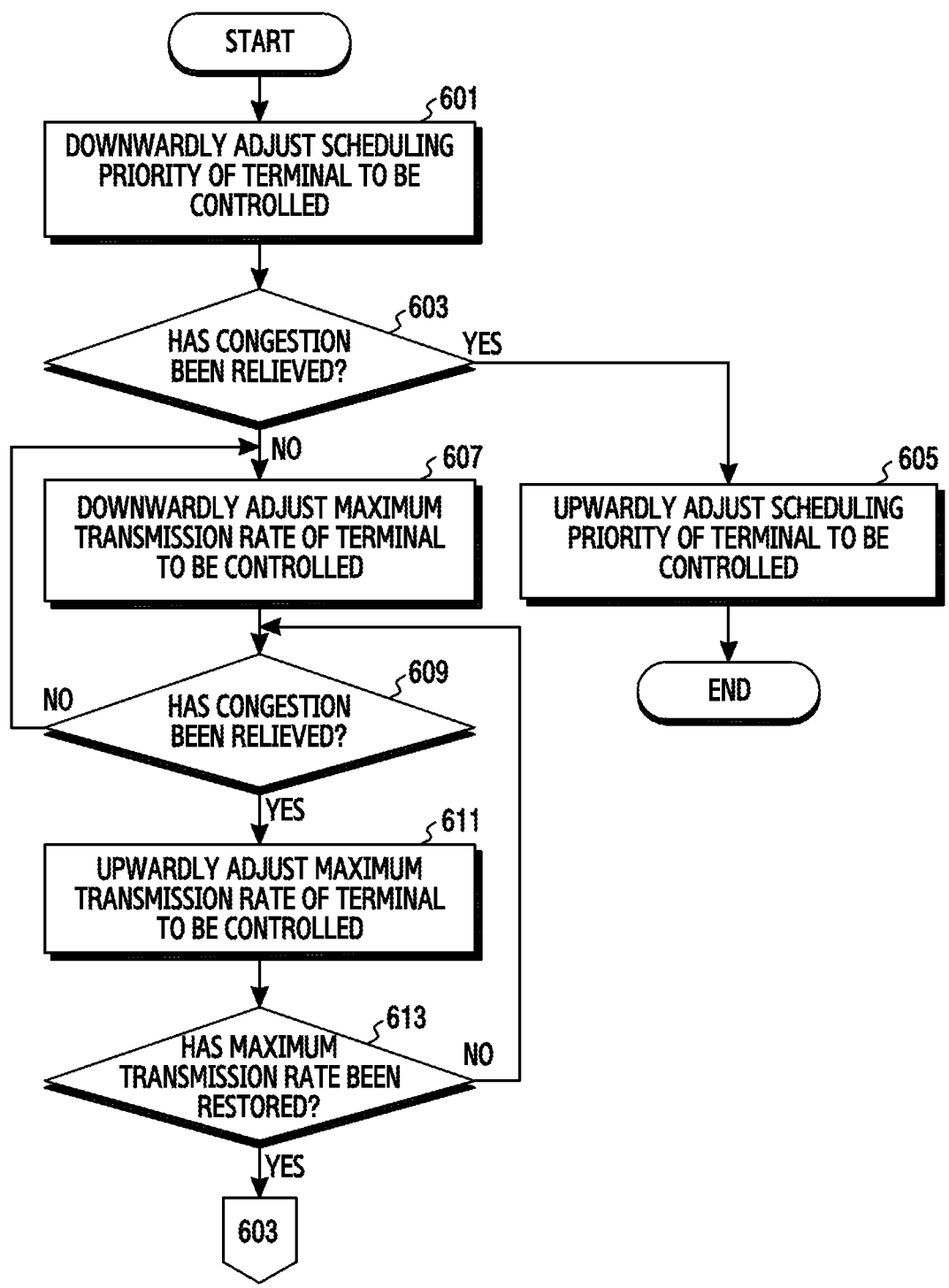
FIG. 6 illustrates an operation method for controlling a scheduling parameter in a wireless communication system according to various embodiments of the present disclosure.

FIG. 6 illustrates an operation method for controlling a scheduling parameter in a wireless communication system according to various embodiments of the present disclosure. The operations exemplified in FIG. 6 may be performed by the base station 120 or the traffic control server 170. Hereinafter, the subject of the operations illustrated in FIG. 6 is referred to as "a controlling device" for convenience of the description. The procedure in FIG. 6 may be understood as specific operations in operation 405 of FIG. 4. With respect to FIG. 6, a description is made on the basis of one apparatus to be controlled. When there are multiple apparatuses to be controlled, the procedure of FIG. 6 may be applied to each of the apparatuses to be controlled.

Referring to FIG. 6, in operation 601, the controlling device downwardly adjusts a scheduling priority of a terminal to be controlled. That is, as the controlling device detects a congestion situation while a normal scheduling is performed to all terminals in a non-congestion situation, the controlling device lowers a scheduling priority of a terminal to be controlled. According to an embodiment, the controlling device may periodically determine whether there is congestion, and may downwardly adjust a scheduling priority according to a single detection of the congestion situation. According to another embodiment, the controlling device may downwardly adjust a scheduling priority according to consecutive detection of the congestion situation at a predetermined number of times or more. In this case, even if a congestion situation and a non-congestion situation are repeated within a range smaller than a predetermined number of times, traffic control may not be performed.

Then, in operation 603, the controlling device determines whether the congestion situation is relieved. That is, the controlling device determines whether a condition defined for detecting a congestion situation is met. In other words, the controlling device determines whether a non-congestion situation is detected.

When the congestion situation is relieved, the controlling device upwardly adjusts the scheduling priority of the terminal to be controlled, in operation 605. That is, the controlling device downwardly adjusts the scheduling priority of the terminal to be controlled, according to detection of the congestion situation. Then, when detecting a non-congestion situation, the controlling device restores the scheduling priority of the terminal to be controlled. According to an embodiment, the controlling device may periodically determine whether there is congestion, and may upwardly adjust a scheduling priority according to a single detection of the non-congestion situation. According to another embodiment, the controlling device may upwardly adjust a scheduling priority according to consecutive detection of the non-congestion situation at a predetermined number of times or more.

Meanwhile, when the congestion situation is not relieved, the controlling device downwardly adjusts a maximum transmission rate of the terminal to be controlled, in operation 607. That is, the controlling device downwardly adjusts a scheduling priority of the terminal to be controlled, according to detection of the congestion situation. Then, when detecting congestion occurrence again, the controlling device lowers a maximum transmission rate of the terminal to be controlled. According to an embodiment, the controlling device may periodically determine whether there is congestion, and may downwardly adjust a maximum transmission rate according to a single detection of the congestion situation. According to another embodiment, the controlling device may downwardly adjust a maximum transmission rate according to consecutive detection of the congestion situation at a predetermined number of times or more.

Subsequently, in operation 609, the controlling device determines whether the congestion situation is relieved. That is, the controlling device determines whether a condition defined for detecting a congestion situation is met. In other words, the controlling device determines whether a non-congestion situation is detected. When the congestion situation is not relieved, the controlling device returns to operation 607 and downwardly adjusts a maximum transmission rate of the terminal to be controlled.

Meanwhile, when the congestion situation is relieved, the controlling device upwardly adjusts a maximum transmission rate of the terminal to be controlled, in operation 611. That is, the controlling device lowers a maximum transmission rate of the terminal to be controlled, according to detection of the congestion situation. Then, when detecting a non-congestion situation, the controlling device increases a maximum transmission rate of the terminal to be controlled. According to an embodiment, the controlling device may periodically determine whether there is congestion, and may upwardly adjust a maximum transmission rate according to a single detection of the non-congestion situation. According to another embodiment, the controlling device may upwardly adjust a maximum transmission rate according to consecutive detection of a non-congestion situation at a predetermined number of times or more.

Then, in operation 613, the controlling device determines whether the maximum transmission rate of the terminal to be controlled is restored. In other words, the controlling device determined whether the maximum transmission rate having been downwardly adjusted by the traffic control is upwardly adjusted again. That is, the controlling device determines whether an amount by which the maximum transmission rate has been downwardly adjusted is identical to an amount by which the maximum transmission rate has been upwardly adjusted. When the maximum transmission rate is not restored, the controlling device returns to operation 609. However, when the maximum transmission rate is restored, the controlling device returns to operation 603.

As described with reference to FIG. 6, a traffic control may be performed. Specifically, according to detection of congestion situation, the controlling device may adjust a scheduling priority or a maximum transmission rate. The scheduling priority or the maximum transmission rate may be adjusted by another factor regardless of traffic control. Therefore, even if the controlling device determines that the maximum transmission rate is restored in operation 613 of FIG. 6, the restored maximum transmission rate may differ from the maximum transmission rate of before operation 607 is primarily performed.

Further, the adjustments of scheduling priority and the maximum transmission rate described in the procedure in FIG. 6 corresponds to operations for traffic control according to congestion occurrence, and may be distinguished from an adjustment due to another factor. According to an embodiment, adjusting a scheduling priority or a maximum transmission rate in order to perform traffic control according to congestion occurrence may be implemented to be performed by a separate parameter (for example, traffic control offset) defined for traffic control.

Also, as described with reference to FIG. 6, traffic control may be repeatedly performed and may have different specific contents depending on whether a congestion situation is relieved in response to a traffic control. Respective cases where the scheduling priority or the maximum transmission rate of a terminal to be controlled is controlled according to traffic control may be defined as states of the terminal to be controlled. The state of the terminal to be controlled can be further changed depending on whether user quality of experience is improved or not after scheduling is performed at a predetermined number of times. For example, in case where traffic control is performed as in FIG. 6, the state of the controlled apparatus can be changed as in FIG. 7.

Figure 7:
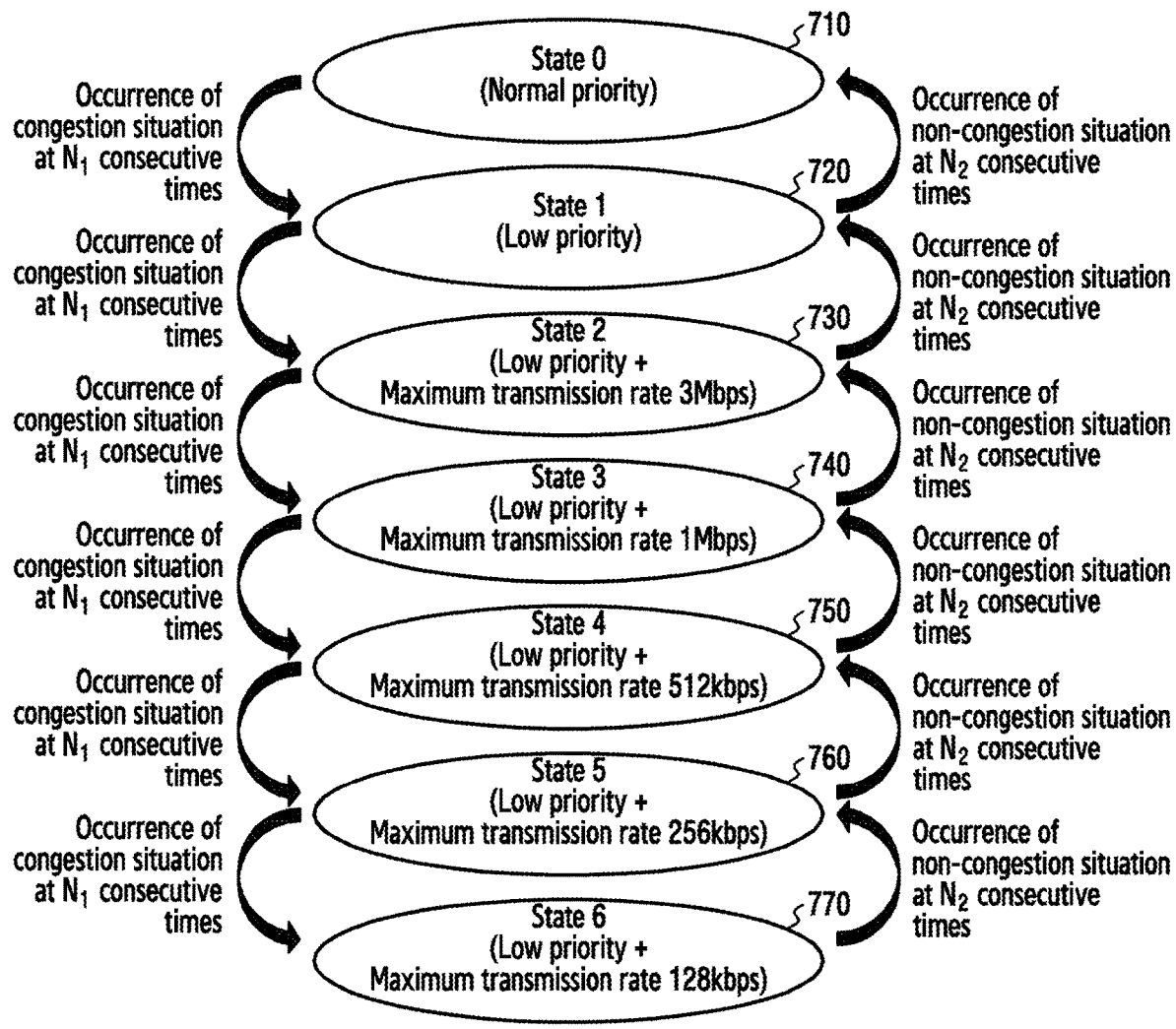
FIG. 7 illustrates an example of a state transition diagram of a scheduling parameter in a wireless communication system according to various embodiments of the present disclosure.

FIG. 7 illustrates an example of a state transition diagram of a scheduling parameter in a wireless communication system according to various embodiments of the present disclosure. FIG. 7 illustrates an example of change in state of a terminal to be controlled.

Referring to FIG. 7, a terminal to be controlled is in initial state 0 (710). In state 0 (710), the terminal to be controlled is scheduled to have a priority at first. When a congestion situation occurs at $N_1$ consecutive times in state 0 (710), the terminal to be controlled transitions to state 1 (720), and the terminal to be controlled is scheduled to have a low priority. For example, when scheduling is performed by proportional fair (PF) scheme, a scheduling priority may be lowered by subtracting a PF weight. When a congestion situation occurs at $N_1$ consecutive times in state 1 (720), the terminal to be controlled transitions to state 2 (730), and the terminal to be controlled is scheduled to have a maximum transmission rate of 3 Mbps, as well as to have a low priority. For example, a QoS parameter is modified so that a maximum transmission rate may be limited. For example, a maximum transmission rate may be limited through an aggregate maximum bit rate (AMBR) parameter. Similarly, as a congestion situation occurs at $N_1$ consecutive times, the terminal to be controlled may gradationally transition to state 3 (740), state 4 (750), state 5 (760), and state 6 (770).

In addition, when a non-congestion situation occurs at $N_2$ consecutive times in state 6 (770), the terminal to be controlled transitions to state 5 (760), and the terminal to be controlled is scheduled to have a low priority and a maximum transmission rate of 256 Kbps. Similarly, as a non-congestion situation occurs at $N_2$ consecutive times, the terminal to be controlled may gradationally transition to state 4 (750), state 3 (740), state 2 (730), and state 1 (720). As the terminal to be controlled gradationally transitions to state 4 (750), state 3 (740), state 2 (730), and state 1 (720), the maximum transmission rate of the terminal to be controlled may be gradationally increased. Then, when a non-congestion situation occurs at $N_2$ consecutive times in state 2 (730), the terminal to be controlled transitions to state 1 (720), and the terminal to be controlled is scheduled to have a low priority.

As the embodiments described above, the base station 120 or the traffic control server 170 may perform traffic control on a terminal to be controlled. To this end, the base station 120 or the traffic control server 170 receives information about the terminal to be controlled, in other words, information about a heavy user. The information about a heavy user may be derived by the management server 160. Operations in which the management server 160 produces and processes information about a heavy user are the same as illustrated in FIG. 8.

Figure 8:
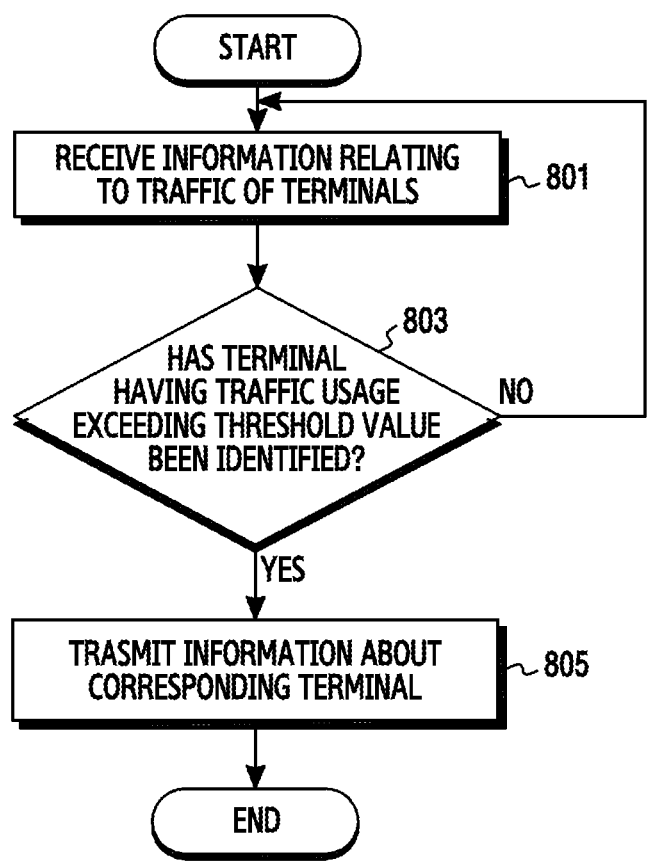
FIG. 8 illustrates an operation method for identifying a heavy user in a wireless communication system according to various embodiments of the present disclosure.

FIG. 8 illustrates an operation method for identifying a heavy user in a wireless communication system according to various embodiments of the present disclosure. FIG. 8 illustrates an example of an operation method of the management server 160.

Referring to FIG. 8, the management server receives information relating to traffic of terminals, in operation 801. For example, information relating to traffic may be provided from a gateway (for example, the gateway 130). Accordingly, the management server can monitor traffic usage of respective terminals which are being connected.

Then, in operation 803, the management server determines whether a terminal having a traffic usage exceeding a threshold value is identified. In other words, the management server determines whether a heavy user exists. A traffic usage may be defined as a traffic volume per unit time. For example, a unit time may be defined as a unit of a day, a week, or a month. The threshold value may be differently defined according to a specific embodiment, that is, a policy of a network operator.

When a terminal having a traffic usage exceeding a threshold value is identified, the management server transmits information about the corresponding terminal, in operation 805. For example, the management server may transmit information about a heavy user to a base station (for example, the base station 120), or may transmit information about a heavy user to at least another entity. According to an embodiment, the management server may transmit identification information of the corresponding terminal and information for identifying a heavy user. The information for identifying a heavy user may include at least one of a heavy user indicator and a QoS modification information.

As described above, the management server may generate information about a heavy user, and the base station or the traffic control server may perform traffic control on the heavy user. According to various embodiments, a core network may detect information of a terminal to be controlled, on traffic control, through charging information, data traffic usage, and QoS information. According to an embodiment, a core network may define a user having a data traffic usage greater than that of a normal user, as a heavy user, and may define an identifier which can transfer information about a heavy user to the base station. An identifier according to an embodiment may be defined using IP of a terminal and a message defined in a third-generation partnership project (3GPP) standard, and QoS information (for example, allocation and retention priority (ARP) and AMBR) according to traffic type. A more specific embodiment for traffic control will be described with reference to FIG. 9.

Figure 9:
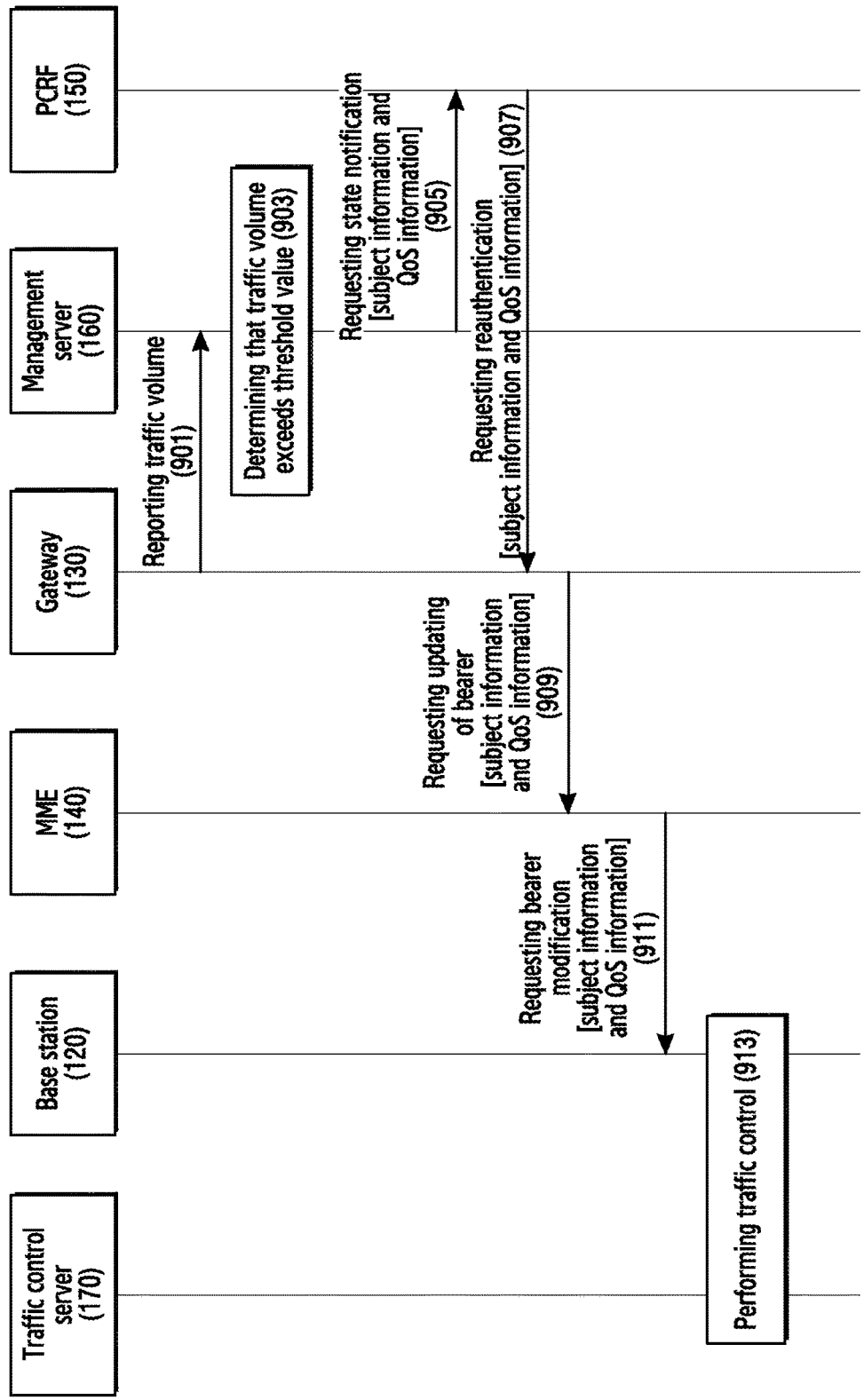
FIG. 9 is a signal flow diagram illustrating signal exchange for traffic control in a wireless communication system according to various embodiments of the present disclosure.

FIG. 9 is a signal flow diagram illustrating a signal exchange for traffic control in a wireless communication system according to various embodiments of the present disclosure.

Referring to FIG. 9, the gateway 130 transmits a report on traffic volume to the management server 160, in operation 901. In other words, the gateway 130 provides data traffic usage on each individual subscriber. Accordingly, the management server 160 may collect the sum of traffic usage of subscribers. Then, the management server 160 may monitor whether excessive traffic usage during a predetermined period occurs.

In operation 903, the management server 160 determines whether the traffic volume of a particular terminal exceeds a threshold value. When a particular terminal uses a traffic volume, during a period, exceeding a traffic volume predetermined according to the definition of a heavy user, the management server 160 can detect the excessive use.

In operation 905, the management server 160 transmits a status notification request (SNR) to the PCRF 150. The SNR may include subject terminal information and QoS information. For example, an SNR may request change of an ARP value of a corresponding terminal, and the QoS information may include the required ARP value. That is, the management server 160 transmits a message for requiring change of the ARP value of a terminal to be controlled. The required ARP value may be determined depending on the traffic usage of a corresponding terminal. For example, a relation between the required ARP value and the traffic usage may be defined as in table 2 below.

TABLE 2

| Traffic usage | >0.5 G | >1 G | >1.5 G | >2 G | >2.5 G | >3 G |
|---|---|---|---|---|---|---|
| Required ARP value | 10 | 11 | 12 | 13 | 14 | 15 |

As in table 2, as a required ARP value is greater, a corresponding traffic usage may be greater.

In operation 907, the PCRF 150 transmits re-authentication request (RAR) to the gateway 130. The RAR may include subject terminal information and QoS information. For example, a RAR may request change of an ARP value of a corresponding terminal, and the QoS information may include the required ARP value. Accordingly, the gateway 130 changes the attribute of a bearer of the corresponding terminal.

In operation 909, the gateway 130 transmits an update bearer request to the MME 140. That is, the gateway 130 notifies the MME 140 that the attribute of a bearer of a terminal to be controlled has been changed. The update bearer request may include subject terminal information and QoS information. For example, the QoS information may include the required ARP value.

In operation 911, the MME 140 transmits a modify bearer request to the base station 120. That is, the MME 140 requests change of the attribute of a bearer of a terminal to be controlled, from the base station 120. The modify bearer request may include subject terminal information and QoS information. For example, the QoS information may include the required ARP value. Accordingly, the base station 120 changes the attribute of a bearer of the terminal to be controlled. Then, the base station 120 can recognize that the terminal to be controlled is a heavy user, on the basis of the ARP value. That is, respective entities including the MME 140 notify that the terminal is a heavy user, by using an ARP value.

Then, in operation 913, the base station 120 and the traffic control server 170 perform traffic control. For example, the base station 120 reports information about a heavy user to the traffic control server 170. Further, when congestion occurs, the base station 120 and the traffic control server 170 change a parameter relating to scheduling on a heavy user. According to an embodiment, the traffic control server 170 may perform traffic control in consideration of the situations of a plurality of base stations including the base station 120.

According to aforementioned various embodiments, traffic control may be performed. In the aforementioned various embodiments, a terminal to be controlled is selected depending on a traffic usage of each user. That is, the aforementioned various embodiments relate to a scheme of traffic control for each user. According to another embodiment, traffic control for each application may be performed. In case of traffic control for each application, a core network identifies what type of application, traffic for which is included in a packet intended for a terminal, and marks a corresponding packet. Accordingly, the base station may identify a packet including traffic for a particular application, and may perform traffic control for each application. To this end, hereinafter, a network entity as in FIG. 10 may be used.

Figure 10:
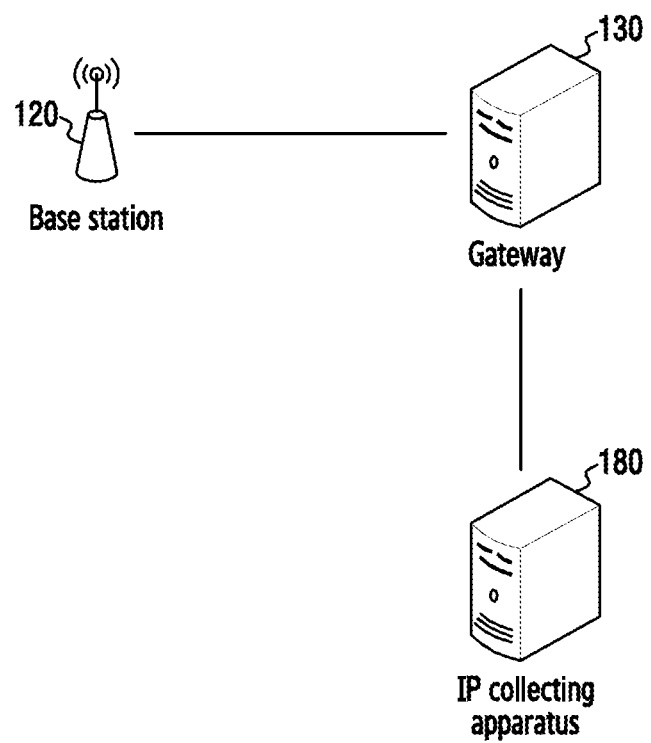
FIG. 10 illustrates network entities for traffic control for each application in a wireless communication system according to various embodiments of the present disclosure.

FIG. 10 illustrates network entities for traffic control for each application in a wireless communication system according to various embodiments of the present disclosure.

Referring to FIG. 10, a wireless communication system includes a base station 120, a gateway 130, and an IP collecting apparatus 180.

The IP collecting apparatus 180 provides information about application servers. Specifically, the IP collecting apparatus 180 stores information relating to an IP address of each application server and a type of a corresponding application. Accordingly, the IP collecting apparatus 180 may provide information relating to an IP address of each application server and a type of a corresponding application, to the gateway 130, such that the gateway 130 can identify an application relating to a received packet. In FIG. 10, the IP collecting apparatus 180 and the gateway 130 are illustrated as separate entities. However, according to another embodiment, the IP collecting apparatus 180 may be included in the gateway 130.

Figure 11:
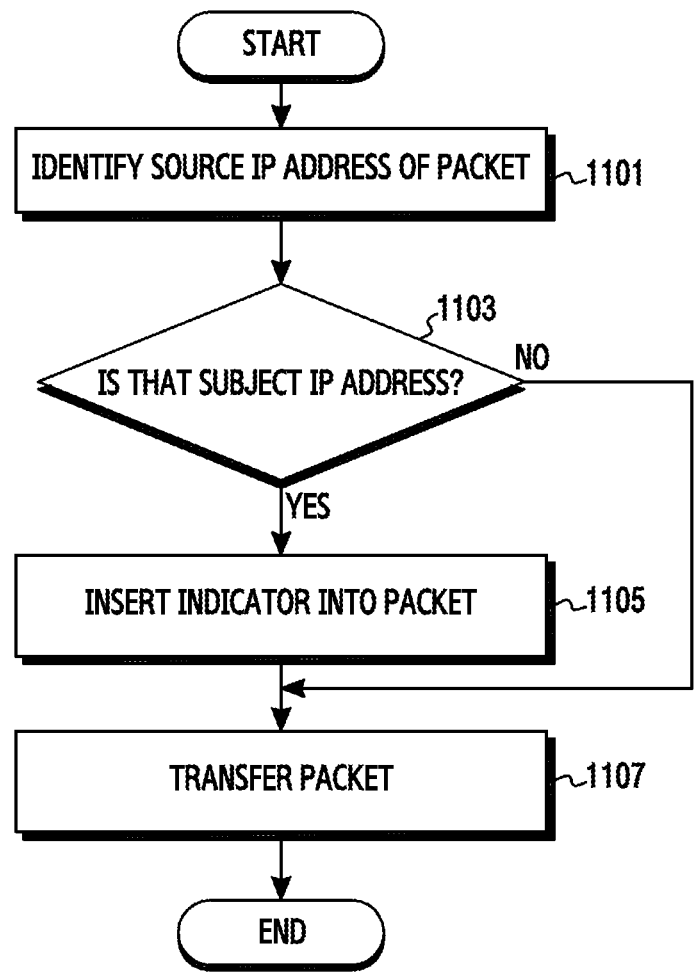
FIG. 11 illustrates an operation method for marking a packet including traffic for a particular application in a wireless communication system according to various embodiments of the present disclosure.

FIG. 11 illustrates an operation method for marking a packet including traffic for a particular application in a wireless communication system according to various embodiments of the present disclosure. FIG. 11 illustrates an example of an operation method of the gateway 130.

Referring to FIG. 11, the gateway identifies a source IP address of a packet, in operation 1101. In other words, the gateway 130 identifies a source IP address of a downlink packet intended for a terminal. That is, the gateway 130 identifies a transmitter of a packet intended for a terminal.

Then, in operation 1103, the gateway identifies whether the identified source IP address matches a subject IP address. The subject IP address is an IP address of a server which provides an application subjected to traffic control. The subject IP address may be provided from a separate apparatus (for example, the IP collecting apparatus 180), directly collected by the gateway, or input by a network operator. According to an embodiment, the subject IP address may include the IP address of a server which provides an application inducing a high capacity of traffic. Also, the subject IP address may include the IP address of a server which provides an application which can be provided even if a data rate is reduced. For example, the subject IP address may include the IP address of a server providing a video streaming service. That is, the gateway searches for the identified source IP address in a list including subject IP addresses. When the source IP address of a packet differs from the subject IP address, the gateway enters operation 1107 without additional process.

Meanwhile, when the identified source IP address matches the subject IP address, the gateway inserts an indicator into the packet, in operation 1105. That is, when the source IP address of a packet matches the IP address of a given application server, the gateway marks the corresponding packet. For example, the indicator may be inserted into an IP header. Specifically, the indicator may be inserted into a vendor-specific information element (IE). In another example, the indicator may be inserted into a differentiated services codepoint (DSCP) field.

Then, in operation 1107, the gateway transfers the packet to the base station. In a case where operation 1105 is performed, the gateway transfers a marked packet, that is, a packet including an indicator notifying that traffic for a particular application is included in the packet. In this case, the base station may perform traffic control depending on an application by a rule given to improve a user quality of experience.

Figure 12:
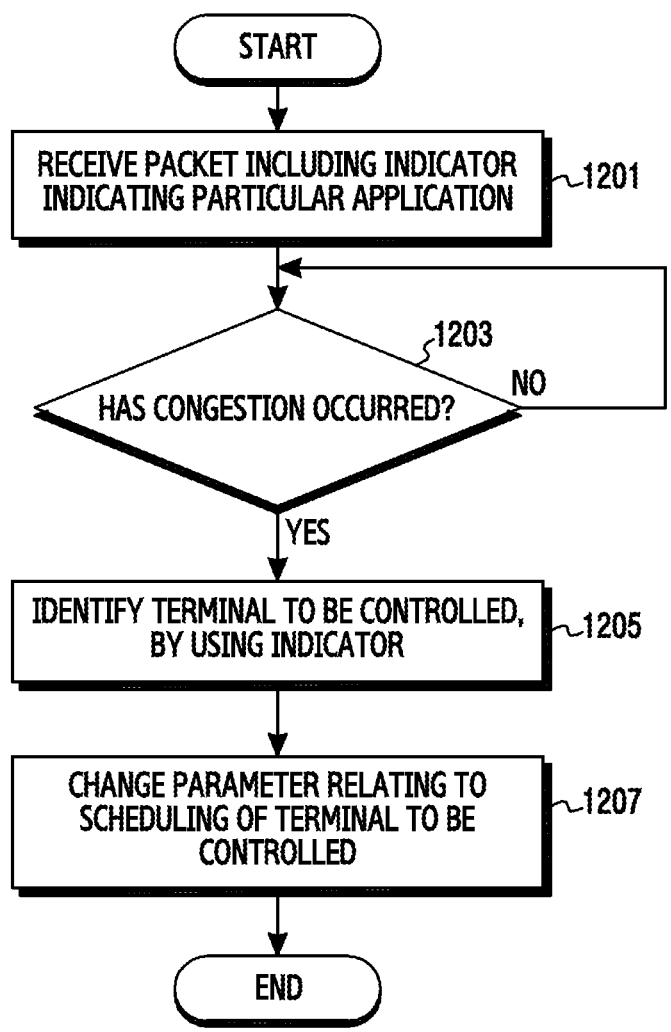
FIG. 12 illustrates an operation method for traffic control for each application in a wireless communication system according to various embodiments of the present disclosure.

FIG. 12 illustrates an operation method for traffic control for each application in a wireless communication system according to various embodiments of the present disclosure. The operations exemplified in FIG. 12 may be performed by the base station 120 or the traffic control server 170. Hereinafter, the subject of the operations in FIG. 12 is referred to as "a controlling device", for convenience of the description.

Referring to FIG. 12, the controlling device receives a packet including an indicator indicating a particular application, in operation 1201. The received packet is a packet intended for a terminal, and the packet may be transferred to the terminal. When an IP packet is received through tunneling, the controlling device may identify an indicator included in an IP header for tunneling or an indicator included in an IP header before tunneling. However, according to an embodiment, when the controlling device corresponds to the traffic control server 170, operation 1201 is omitted, and the controlling device may receive information relating to a packet (for example, whether a packet including an indicator is received, and identification information of a corresponding terminal), instead of a packet itself.

Then, the controlling device determines whether congestion occurs, in operation 1203. In other words, the controlling device determines whether congestion occurs in a cell of the base station 120, that is, a load level exceeds a threshold level. A standard for determining congestion may be variously defined. For example, congestion may be determined on the basis of at least one of resource usage, the number of connected terminals, the number of terminals in a RRC connection state, the number of active terminals, and data throughput.

In operation 1205, the controlling device identifies a terminal to be controlled, using an indicator. That is, the controlling device determines the need for traffic control according to occurrence of congestion and then determines which terminal on which traffic control is performed. A terminal which generates traffic for a particular application is considered as a terminal to be controlled. Therefore, the controlling device can identify a terminal to be controlled, using an indicator indicating a particular application.

Then, in operation 1207, the controlling device changes a parameter relating to scheduling of the terminal to be controlled. In other words, the controlling device changes a parameter relating to scheduling on at least one heavy user in a cell in which congestion occurs. A parameter relating to scheduling may be a parameter relating to determination of scheduling priority, a parameter relating to a maximum transmission rate, or another parameter affecting data throughput.

Methods according to various embodiments mentioned in claims or specification of the present disclosure may be implemented in the form of hardware, software, or a combination of the hardware and the software. In case where the methods are implemented by software, a computer-readable storage medium storing one or more programs (i.e., software modules) may be provided. The one or more programs stored in the computer-readable storage medium are configured to be executable by one or more processors within an electronic device. The one or more programs include instructions for enabling the electronic device to execute the methods according to various embodiments stated in the claims or specification of the present disclosure.

This program (i.e., a software module and software) may be stored in a random-access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of another form, and a magnetic cassette. Or, the program may be stored in a memory that is constructed in combination of some or all of them. Also, each constructed memory may be included in plural as well.

Further, the program may be stored in an attachable storage device that may gain access through a communication network such as the Internet, an intranet, a local area network (LAN), a wireless LAN (WLAN) or a storage area network (SAN), or a communication network constructed in combination of them. This storage device may connect to a device performing an embodiment of the present disclosure through an external port. Also, a separate storage device on the communication network may connect to the device performing the embodiment of the present disclosure.

In the aforementioned concrete various embodiments of the present disclosure, constituent elements included in the disclosure have been expressed in a singular form or plural form in accordance to a proposed concrete various embodiment. But, the expression of the singular form or plural form is selected suitable to a proposed situation for description convenience, and it is not that the present disclosure is limited to singular or plural constituent elements. Even a constituent element expressed in the plural form may be constructed in the singular form, or even a constituent element expressed in the singular form may be constructed in the plural form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating an apparatus that performs traffic control in a wireless communication system, the method comprising:
  receiving information about a terminal to be controlled, the information including an allocation and retention priority (ARP) value requested to be change;
  identifying the terminal to be controlled based on the ARP value requested to be changed, wherein the ARP value requested to be changed is greater as traffic usage of the terminal to be controlled is greater;
  detecting a congestion situation in a cell based on a ratio of terminals having a throughput equal to or less than a predetermined threshold value in the cell; and
  changing a parameter relating to scheduling of the terminal to be controlled, according to the detection of the congestion situation.

2. The method of claim 1, wherein the detecting of the congestion situation in the cell comprises determining the congestion situation based on at least one of a physical resource block (PRB) usage, a number of connected terminals, a number of radio resource control (RRC) connected terminals, a number of active terminals, and a data throughput.

3. The method of claim 1, wherein the changing of the parameter relating to the scheduling of the terminal to be controlled comprises:
  changing a parameter relating to determination of a scheduling priority of the terminal to be controlled, or a parameter relating to a maximum transmission rate of the terminal to be controlled.

4. The method of claim 1, wherein the changing of the parameter relating to the scheduling of the terminal to be controlled comprises downwardly adjusting a scheduling priority of the terminal to be controlled.

5. The method of claim 4, wherein the adjusting of the scheduling priority of the terminal to be controlled comprises adjusting a proportional fair (PF) weight, if the scheduling is performed according to the PF weight.

6. The method of claim 4, wherein the changing of the parameter relating to the scheduling of the terminal to be controlled comprises upwardly adjusting the scheduling priority of the terminal to be controlled, if the congestion situation is relieved after the downwardly adjusting of the scheduling priority.

7. The method of claim 4, wherein the changing of the parameter relating to the scheduling of the terminal to be controlled further comprises downwardly adjusting a maximum transmission rate of the terminal to be controlled, if the congestion situation occurs again after the downwardly adjusting of the scheduling priority.

8. The method of claim 7, wherein the adjusting of the maximum transmission rate of the terminal to be controlled comprises adjusting a quality of service (QoS) parameter.

9. The method of claim 7, wherein the changing of the parameter relating to the scheduling of the terminal to be controlled further comprises upwardly adjusting the maximum transmission rate of the terminal to be controlled, if the congestion situation is relieved after the downwardly adjusting of the maximum transmission rate.

10. The method of claim 1, wherein the terminal to be controlled is identified on the basis of whether a packet transmitted to the terminal to be controlled is marked.

11. A method for operating a management server in a wireless communication system, the method comprising:
  receiving information on traffic usage of a plurality of terminals from a gateway; and
  transmitting information about a terminal to be controlled based on a ratio of terminals having a throughput equal to or less than a predetermined threshold value in a cell, among the plurality of terminals, if the terminal to be controlled having a traffic usage exceeding a threshold value is identified,
  wherein the information includes an allocation and retention priority (ARP) value requested to be changed, and the ARP value requested to be changed is greater as traffic usage of the terminal to be controlled is greater.

12. The method of claim 11, wherein the traffic usage of terminals is an amount of traffic per a day, a week, or a month.

* * * * *